March 3, 1964    A. N. ORMOND    3,122,917
MOUNTING STRUCTURE FOR MAKING LOAD MEASUREMENTS
Filed Oct. 13, 1960

INVENTOR.
ALFRED N. ORMOND
BY Elliott & Pastoriza
ATTORNEYS

United States Patent Office 3,122,917
Patented Mar. 3, 1964

3,122,917
MOUNTING STRUCTURE FOR MAKING
LOAD MEASUREMENTS
Alfred N. Ormond, P.O. Box 238, Inglewood, Calif.
Filed Oct. 13, 1960, Ser. No. 62,380
2 Claims. (Cl. 73—116)

This invention relates generally to mounting structures and more particularly to structures for supporting relatively large bodies of considerable mass while carrying out tests thereon.

In making load measurements on massive bodies, such as thrust measurements on rocket motors for example, it is conventional practice to support the motor within a test chamber and take direct readings from load cells connected between the motor and a stationary structure. It is desirable in such tests that the mounting structure supporting the body exert as little reaction as possible on the body as a result of displacement of the body so that the direct readings will provide a true indication of the forces being measured. For example, if measurements are made in a horizontal direction, any horizontal displacement of a suspended mass will give rise to a gravitational force component in the horizontal direction exerted on the mass through the suspension supports. Similarly, if a body is supported by compression members disposed beneath the body, horizontal movement of the body will introduce horizontal gravitational components tending to add to the forces being measured. Thus, suitable correction factors for these pendulum effects must be introduced.

With the above in mind, it is a primary object of this invention to provide a novel mounting structure for massive bodies in which the aforementioned gravitational components resulting from the pendulum effects are cancelled to the end that more accurate measurements may be taken and any reaction of the supporting structure itself on the measurements are minimized.

More particularly, it is an object to provide a novel mounting means for large bodies which provides essentially a zero co-efficient of restitution in response to horizontal displacement of the body.

Briefly, these and other objects and advantages of this invention are achieved by taking advantage of the pendulum effect to generate counteracting forces in a mounting structure which exactly balances the existing undesired forces. This cancellation of gravitational components may be achieved by dual support mountings in which one support means is placed in tension and the other support means in compression so that one exhibits a negative co-efficient of restitution and the other a positive co-efficient of restitution. The net co-efficient of restitution of the entire support structure as a consequence of gravitational components is thus zero, and the objective of minimizing reactions of mounting structures for supporting the bodies is achieved.

A better understanding of the principles of this invention will be had by referring to the following schematic diagrams, in which.

Figure 1:
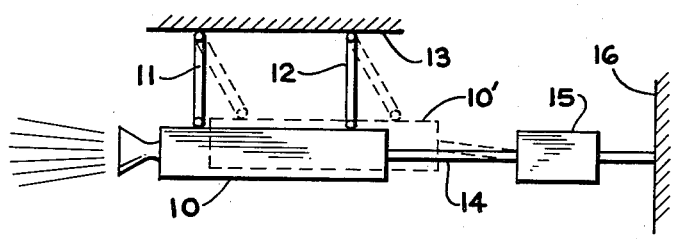
FIGURE 1 illustrates a suspension type mounting for a mass such as a rocket motor undergoing thrust tests.

Referring first to FIGURE 1, there is illustrated schematically a body or mass 10 which may constitute a rocket engine undergoing a thrust test. As shown, the mass 10 is held by supports 11 and 12 depending from a stationary structure 13. An actuating rod 14 secured to the body 10 extends to one side of a load cell 15 secured to a stationary structure 16.

Thrust reaction force exerted on the body 10 will tend to move it horizontally to the right. As a consequence of the suspending type mountings 11 and 12, there will also be a slight vertical displacement as indicated by the dotted line 10'. This vertical displacement gives rise to a gravitational component of force in a horizontal direction which is opposed to the direction of the thrust forces thus reducing the forces in the member 14 being measured by the load cell 15. There is thus introduced a positive force co-efficient for which a correction must be made when a mounting such as illustrated in FIGURE 1 is employed.

Figure 2:
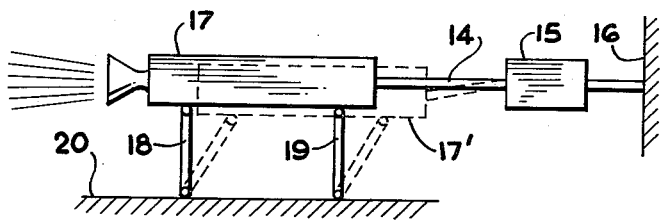
FIGURE 2 shows an alternative mounting.

FIGURE 2 shows a system similar to FIGURE 1 except that the mass 17 is supported by compression members 18 and 19 to a stationary structure 20 disposed beneath the mass 17. In this instance, horizontal movement of the mass 17 to the right will result in a vertical displacement in a downward direction as indicated by the dotted line position 17'. The resulting angulation of the mounting members 18 and 19 establishes a gravitational component of force adding to the force exerted in the rod 14 in the horizontal direction. There is thus provided a negative co-efficient of restitution for which a correction must be made in the reading of the load cell 15.

In accordance with the present invention, the foregoing principles are combined so that both a positive and a negative co-efficient of restitution is introduced on the body to result in a zero co-efficient of restitution so that the forces in the rod 14 upon lateral or horizontal displacement of the body will be a true measure of the thrust.

Figure 3:
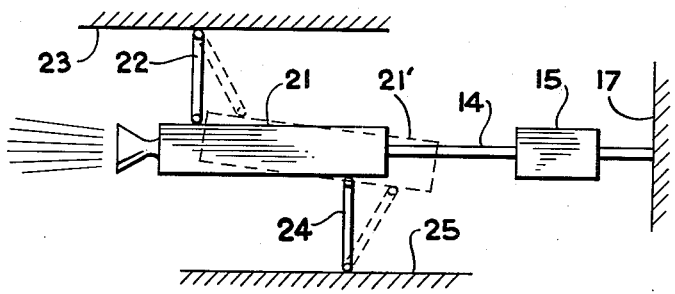
FIGURE 3 shows a mounting design in accordance with the present invention which avoids undesired forces established by gravitational components in the mountings of FIGURES 1 and 2; and, FIGURE 4 illustrates a modified structural embodiment of the mounting of FIGURE 3.

Thus, referring specifically to FIGURE 3, there is shown a mass 21 and first supporting member 22 secured at one end to a stationary structure 23 and depending downwardly to be coupled to a portion of the mass 21. The member 22 is in tension and is similar to the member 11 of FIGURE 1 in that it, together with the mass 21, will establish a positive restoring co-efficient when considered alone and the mass is moved laterally. A second support member 24 is coupled to a stationary structure 25 and extends upwardly to a second portion of the mass 21 so that it will be in compression. With this arrangement, a negative co-efficient of restitution will be established by the second support mounting 24 and mass 21 when considered alone and the mass is moved laterally. This second co-efficient is made equal and opposite to the first co-efficient. When both the support members 22 and 24 are employed together, the mass 21 upon horizontal movement will assume the position illustrated in the dotted lines illustrated at 21' and there will thus be zero restoring force resulting from the gravitational components in view of the cancellation of the positive and negative force co-efficients established. Therefore, the load cell 15 will provide a true measure independent of forces established by the aforementioned gravitational components.

Figure 4:
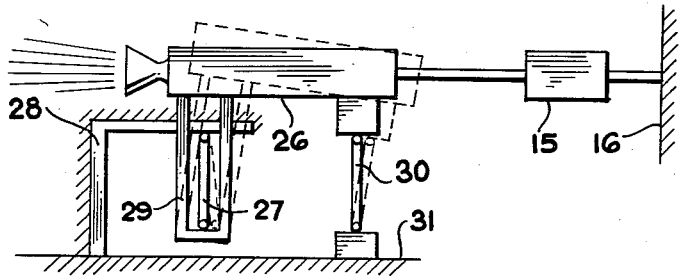

FIGURE 4 illustrates a system incorporating the principles of FIGURE 3 wherein the mounting means may be disposed wholly on one side of the mass. Thus, in FIGURE 4 there is shown a mass 26 and a first mounting means shown as a member 27 extending downwardly from an inwardly projecting arm portion 28 of the stationary support structure. The other end of the mounting means extending furthest from the mass 26 in turn is coupled to the mass itself through an outwardly projecting frame portion 29 extending from the mass 26. With this arrangement, the first mounting means 27 is placed in tension by the mass 26 even though it is disposed beneath the mass. The second mounting means comprises a member 30 which is disposed beneath the mass 26 and is normally in compression. There thus results a structure in which both positive and negative force co-efficients are introduced to provide the desired cancellation of the pendulum effects as described in connection with FIGURE 3.

It will be evident that the structure of FIGURE 4 could be inverted to suspend the body 26 from one side thereof in which case the member 27 would be in compression and the member 30 in tension.

From the foregoing description, it will be evident that the present invention has provided a greatly improved mounting means in which reaction forces resulting from gravity acting on the supported mass are substantially cancelled with the attendant advantage of more accurate readings in load measurements.

It should be understood that in the schematic drawings set forth the various motions have been greatly exaggerated for purposes of clarity. In actual installation, the lateral or horizontal displacement of the mass is extremely small. Nevertheless, because of the relatively large masses involved, the gravitational components introduced as a consequence of the aforementioned pendulum effects are significant. By means of the present mountings, the effects of such components are wholly eliminated.

Modifications of actual supporting means which incorporate the principles of the present invention will occur to those skilled in the art. The mounting structure is therefore not to be thought of as limited to the schematic embodiments set forth merely for illustrative purposes.

What is claimed is:

1. A mounting for supporting a mass subject to gravity to a stationary structure comprising: a first supporting means depending downwardly from said stationary structure and coupled to one portion of said mass so that said first means is placed in tension by the weight of said mass, said one portion of said mass being solely supported by said means such that it will be raised upon horizontal movement of said mass to give rise to a gravitational force component in a first direction tending to lower said mass to its original position; and a second supporting means extending upwardly from said stationary structure and coupled to another portion of said mass spaced horizontally from said one portion so that said second means is placed in compression by the weight of said mass, said another portion of said mass being solely supported by said second means so that it is lowered upon horizontal movement of said mass to give rise to a gravitational force component in a horizontal direction opposite to said first direction tending to further lower said another portion, said first mentioned gravitational force component and said second gravitational force component being equal and in opposite directions so that the net horizontal force component acting on said mass when moved in a horizontal direction resulting from gravity is zero.

2. A mounting according to claim 1, in which one of said supporting means is disposed on the same side of said mass as the other and is parallel to the other when no horizontal displacement of said mass takes place, said stationary structure including a frame portion projecting towards said mass and providing a connecting point for the one end of said one supporting means closest to said mass, said mass including a lateral projecting portion extending in the direction of said one supporting means and connected to the other end of said one supporting means furthest from said mass, whereby said mass may be mounted by supporting structure disposed wholly to one side of said mass.

References Cited in the file of this patent

UNITED STATES PATENTS

| | | |
|---|---|---|
| 2,135,394 | Geissen | Nov. 1, 1938 |
| 2,241,139 | Julien et al. | May 6, 1941 |
| 2,680,373 | Bechberger | June 8, 1954 |